JAMES HUTCHINS.
Improvement in Fanning Mills.

No. 120,745.　　　　　　　　　　　Patented Nov. 7, 1871.

Witnesses.

Inventor.
James Hutchins
By C. A. Hutchins, adminis.
Per Edson Brothers
Attorneys

UNITED STATES PATENT OFFICE.

CHARLOTTE AYER HUTCHINS, OF SYRACUSE, IOWA, ADMINISTRATRIX OF JAMES HUTCHINS, DECEASED.

IMPROVEMENT IN FANNING-MILLS.

Specification forming part of Letters Patent No. 120,745, dated November 7, 1871.

*To all whom it may concern:*

Be it known that JAMES HUTCHINS, deceased, late of Plainfield, in the county of Bremer and State of Iowa, invented a certain new and useful Improvement in Fanning-Mills; and the following is hereby declared to be a full, clear, and exact description thereof, reference being had to the accompanying drawing forming a part of the same, and in which—

Figure 1:
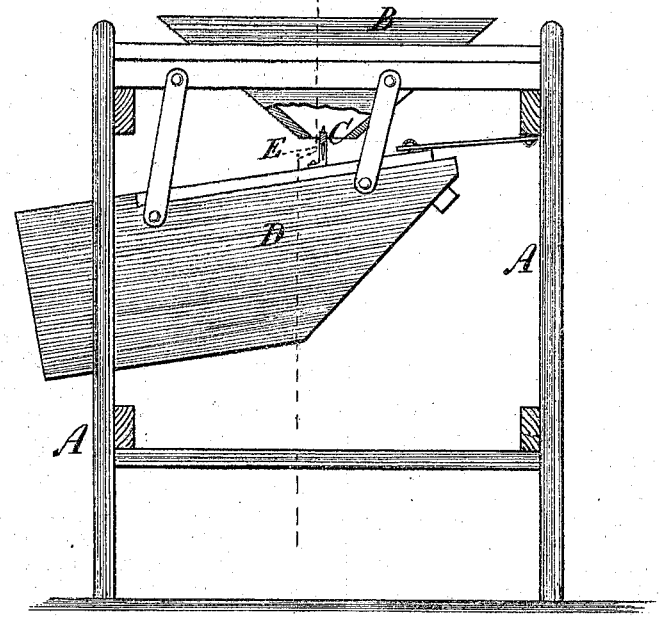
Figure 2:
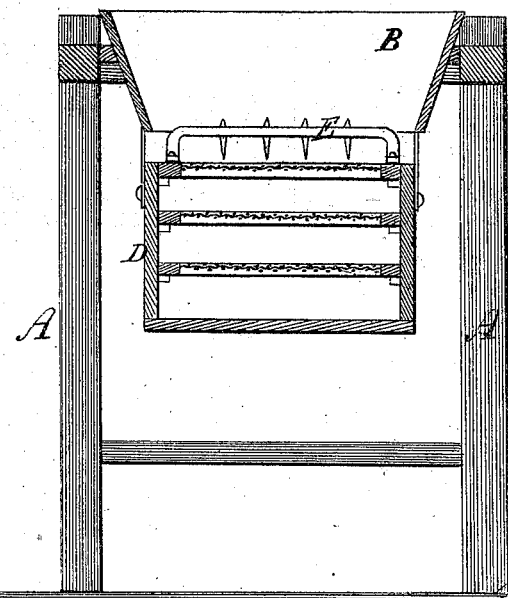
Figure 3:
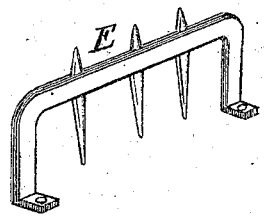

Figure 1 represents a view of the improvement, partly in section and partly in side view, attached to an ordinary fanning-mill; Fig. 2, a side view thereof, in connection with a fanning-mill, taken in section; and Fig. 3 is a perspective view of the same detached from said mill.

This invention has reference to an improvement in fanning-mills; and it consists of the agitator-bar constructed of a frame having a series of teeth made preferably of a diamond shape, substantially as hereinafter more fully set forth and claimed.

Similar letters of reference in the several figures refer to like parts.

In the annexed drawing, A refers to the supporting-frame of a fanning-mill; B, to the hopper, having the throat C; and D, to the receptacle carrying the sieves or screens for cleaning the grain, and to which receptacle is imparted a vibratory motion through a crank, assisted by other devices ordinarily used for that purpose. E refers to the agitator-bar, which consists of a frame or bracket constituted of a bar the horizontal extremities of which are curved and supplied with downward-projecting arms or bars having feet or horizontal resting surfaces through which screws or other fastenings are inserted for securing it upon the upper surface of the vibrating receptacle D in such a manner as that it shall enter the throat C of the hopper B, as shown in Figs. 1 and 2. The said agitator-bar further consists of a series of teeth made preferably of a diamond shape and located or inserted through apertures cut in the frame or bar above alluded to, as plainly shown in Fig. 3.

The object of this agitator-bar is to keep the throat of the hopper of the fanning-mill clear or prevent it from clogging, and, at the same time, to thoroughly spread the grain over the screens or sieves thereof.

Having thus described the invention, what is claimed, and desired to be secured by Letters Patent, is—

The agitator-bar E when constructed as described and shown, and arranged to operate in relation to the vibrating shoe and hopper-throat of a fanning-mill or grain-separator, substantially as and for the purpose described.

In testimony whereof I have hereunto signed my name this 7th day of July, A. D. 1871, in presence of two subscribing witnesses.

CHARLOTTE AYER HUTCHINS,
*Administratrix.*

Witnesses:
CHRYSTAL D. LUCAS,
FOSTER S. FLOWER.                (159)